United States Patent
Yasui et al.

(10) Patent No.: US 7,901,737 B2
(45) Date of Patent: Mar. 8, 2011

(54) PROCESS FOR PRODUCING MAGNETIC RECORDING MEDIUM

(75) Inventors: Nobuhiro Yasui, Kawasaki (JP); Toru Den, Tokyo (JP)

(73) Assignee: Canon Kabushiki Kaisha, Toshiba (JP)

( * ) Notice: Subject to any disclaimer, the term of this patent is extended or adjusted under 35 U.S.C. 154(b) by 999 days.

(21) Appl. No.: 11/448,076

(22) Filed: Jun. 7, 2006

(65) Prior Publication Data
US 2006/0280862 A1 Dec. 14, 2006

(30) Foreign Application Priority Data
Jun. 10, 2005 (JP) .............................. 2005-171430

(51) Int. Cl.
C23C 16/06 (2006.01)
(52) U.S. Cl. .................................. 427/248.1
(58) Field of Classification Search ................. 427/127, 427/130, 248.1
See application file for complete search history.

(56) References Cited

U.S. PATENT DOCUMENTS

| | | | | |
|---|---|---|---|---|
| 5,594,933 A * | 1/1997 | Hayashi et al. | ............. | 428/546 |
| 6,717,777 B2 | 4/2004 | Den et al. | ................... | 360/324 |
| 6,858,319 B2 | 2/2005 | Yasui et al. | ................. | 428/611 |
| 7,167,342 B2 | 1/2007 | Yasui et al. | ................. | 360/135 |
| 2002/0086185 A1 | 7/2002 | Yasui et al. | ................. | 428/694 |
| 2004/0161638 A1 | 8/2004 | Maeda et al. | ................ | 428/694 |
| 2004/0196593 A1 | 10/2004 | Yasui et al. | ................. | 360/135 |
| 2005/0031905 A1 | 2/2005 | Yasui et al. | ................. | 428/693 |
| 2006/0222905 A1 | 10/2006 | Yasui et al. | ................. | 428/836 |
| 2006/0280862 A1 | 12/2006 | Yasui et al. | ................. | 427/127 |

FOREIGN PATENT DOCUMENTS

| | | | |
|---|---|---|---|
| JP | 57-046320 | * | 3/1982 |
| JP | 2002-175621 | | 6/2002 |
| JP | 2004-178753 | | 6/2004 |
| JP | 2004-311607 | | 11/2004 |

* cited by examiner

*Primary Examiner*—Timothy H Meeks
*Assistant Examiner*—Elizabeth Burkhart
(74) *Attorney, Agent, or Firm*—Fitzpatrick, Cella, Harper & Scinto

(57) ABSTRACT

A magnetic recording medium is provided which is contaminated less and improved in magnetic properties. The process for producing a magnetic recording medium having a recording layer constituted of magnetic granule portions dispersed in a nonmagnetic matrix portion comprises a first step of forming, on a base body, a nonmagnetic matrix portion, and Cu or Ag granule portions dispersed therein by a gas-phase deposition method, a second step of laminating magnetic granule portions on the Cu or Ag granule portions and laminating an additional nonmagnetic matrix portion on the nonmagnetic matrix portion formed in the first step, and a third step of heat-treating the laminate.

7 Claims, 6 Drawing Sheets

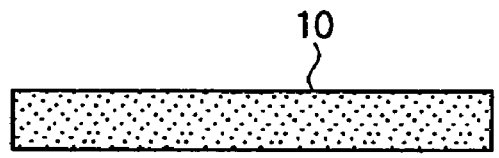
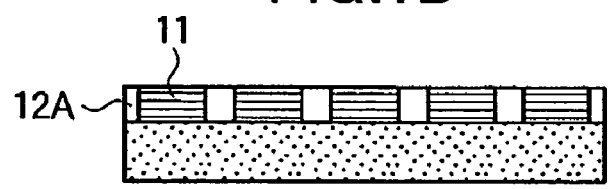
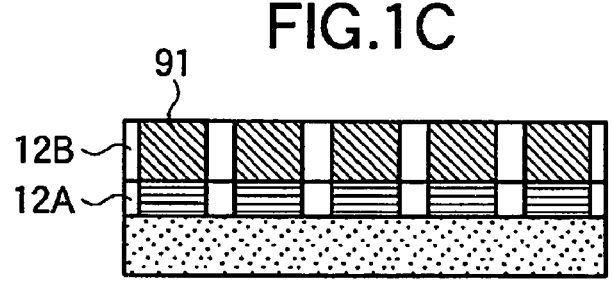
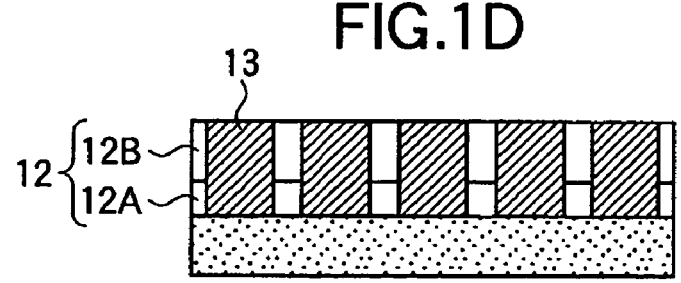

PROCESS FOR PRODUCING MAGNETIC RECORDING MEDIUM

BACKGROUND OF THE INVENTION

1. Field of the Invention

The present invention relates to a process for producing a magnetic recording medium in which magnetic granules are isolated magnetically from each other effectively.

2. Related Background Art

Conventional magnetic recording media for hard disks are of a longitudinal magnetic recording type in which magnetization is recorded in the direction parallel to the disk face. In the longitudinal recording, for higher recording density, the magnetic recording layer is made thinner to produce the magnetic field outside above the recording medium for attenuating the diamagnetic field in the magnetic domains and for detecting the magnetization state. This requires extremely small size of the individual magnetic fine granule, tending to bring about a superparamagnetism effect. Thereby, the energy for stabilizing the magnetization direction becomes smaller than the thermal energy to cause change of the recorded magnetization with lapse of time, resulting in extinction of the magnetic record. Therefore, in recent years, the perpendicular magnetic recording system in which the recording layer can be made thicker is investigated actively to replace the conventional longitudinal magnetic recording system.

The media for the perpendicular magnetic recording have generally a recording layer containing a Co—Cr alloy formed by sputtering. In the layer formation, core portions containing more Co and a shell portion containing more Cr and surrounding the core portions grow separately.

However, in the Co—Cr system, the core portions of a high Co content can not be readily made finer for higher recording density. To offset such disadvantage, $L1_0$-ordered alloys of CoPt and FePt as shown in FIG. 10 are attracting attention in recent years. In FIG. 10, the reference numerals denote the followings: 1, a (001) plane; 2, a normal line for the (001) plane; 3, the direction of c-axis; 4, an element-a; 5, an element-b. For ordering the alloy, the heat treatment of the alloy should be conducted in a granular film state. In the heat treatment for ordering the alloy, coalescence of the magnetic granules occur concurrently. Before the heat treatment, magnetic granules of not larger than 10 nm diameter are isolated by a nonmagnetic matrix portion. In the heat treatment, however, the magnetic granules come to coalesce to form magnetic granules of diameters of several tens of nm, not achieving the marked improvement of performance by finer magnetic granules.

A technique is disclosed for ordering the alloy at a lower temperature (Japanese Patent Application Laid-Open No. 2004-311607: Patent Document 1), in which lower-temperature treatment is realized by addition of Cu to the FePt.

In the technique of the above Patent Document 1, since FePt and Cu are filled into the fine pores by metallizing, contamination by impurity tends to occur not to improve the magnetic properties as expected.

The present invention intends to provide a magnetic recording medium which is contaminated less and has improved magnetic properties.

SUMMARY OF THE INVENTION

According to an aspect of the present invention, there is provided a process for producing a magnetic recording medium having a recording layer comprised of magnetic granule portions dispersed in a nonmagnetic matrix portion, comprising:

a first step of forming, on a base body, a nonmagnetic matrix portion and Cu or Ag granule portions dispersed therein by a gas-phase deposition method, a second step of laminating magnetic granule portions on the Cu or Ag granule portions and laminating an additional nonmagnetic matrix portion on the nonmagnetic matrix portion formed in the first step, and a third step of heat-treating the laminate.

The nonmagnetic matrix portion is preferably composed of $(Si_xGe_{1-x})_yO_{1-y}$ ($0 \leq x \leq 1$, $0.034 \leq y \leq 1$).

The magnetic granule preferably contains Co or MPt (M=Co, Fe).

The first step and the second step may be repeated.

According to another aspect of the present invention, there is provided a process for producing a magnetic recording medium having a recording layer constituted of magnetic granule portions dispersed in a nonmagnetic matrix portion, comprising:

a first step of forming, on a base body, a nonmagnetic matrix portion and Cu or Ag granule portions dispersed therein by a gas-phase deposition method, a second step of laminating Al granule portions on the Cu or Ag granule portions and laminating an additional nonmagnetic matrix portion on the nonmagnetic matrix portion formed in the first step, and a third step of removing the Al granule portions to form pores, filling magnetic granules into the formed pores, and heat treating the magnetic granules.

The nonmagnetic matrix portion is preferably composed of $(Si_xGe_{1-x})_yO_{1-y}$ ($0 \leq x \leq 1$, $0.034 \leq y \leq 1$).

The magnetic granule preferably contains Co or MPt (M=Co, Fe).

The present invention improves the magnetic properties of the magnetic recording medium by producing the medium by gas-phase deposition method with less contamination of magnetic granules by an impurity. The temperature for ordering the magnetic granules can be lowered by dispersing Cu or Ag granules in a nonmagnetic matrix portion.

BRIEF DESCRIPTION OF THE DRAWINGS

FIGS. 1A, 1B, 1C and 1D show an embodiment of the process for production of the present invention.

DESCRIPTION OF THE PREFERRED EMBODIMENTS

Figure 2:
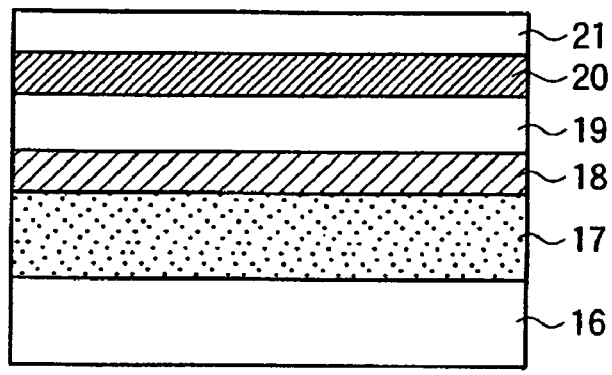
FIG. 2 is a sectional view of a magnetic recording medium.

The process for producing the magnetic recording medium of the present invention is explained below in detail.

FIGS. 1A, 1B, 1C and 1D show a process for production of a magnetic recording medium of the present invention. Firstly, base body 10 is prepared (FIG. 1A). On the base body, Cu or Ag granules 11 and nonmagnetic matrix portion 12A are formed by a gas-phase deposition process to place the granules in dispersion in the nonmagnetic matrix portion (FIG. 1B). Further, magnetic granules 91 are laminated on the above-prepared Cu or Ag granules 11, and nonmagnetic matrix portion 12B is laminated on the nonmagnetic matrix portion 12A to form nonmagnetic matrix portion 12 FIG. 1C). After the lamination, the laminate is heat-treated for ordering magnetic granules 91 to form ordered magnetic granules portions 13 (Fig. 1D). Through the above steps, a magnetic recording medium having improved magnetic properties can be produced.

The constitution of the magnetic recording medium is explained below by reference to FIG. 2. In FIG. 2, the reference numerals denote the followings: 16, a substrate; 17, a soft magnetic layer (backing layer); 18, an underlying layer; 19, a recording layer; 20, a protection layer; 21 a lubrication layer. The process of the present invention relates to the recording layer 19. A magnetic recording medium is constituted of combination of recording layer 19 and other layers.

The layers other than recording layer 19 can be formed by any of conventional methods. For example, soft magnetic layer 17 and underlying layer 18 may be formed by plating, and lubrication layer 21 may be formed by painting.

The elemental techniques of the present invention are explained below individually.

(Gas-Phase Deposition Method)

The gas-phase deposition method herein denotes a technique of depositing a substance from a gas phase onto a base body, including sputtering, molecular beam epitaxy, and evaporation methods. The gas-phase deposition is limited in the conditions: The deposition conditions should be controlled such that, in the process of deposition of the intended substance onto a base body, the substances should be diffusible effectively on the outermost surface to cause phase separation of the respective substances.

It is important to take a measure to promote the diffusion on the surface. For the purpose, in the sputtering, the argon gas pressure for the deposition is lowered from the conventional sputtering pressure of about 0.7 Pa to about 0.1 Pa, and a bias is effectively applied to the substrate. In a molecular-beam epitaxy method, the diffusion is considered to be sufficient since the epitaxy is usually conducted under super-high vacuum of at least about $1 \times 10^{-8}$ Pa. In the evaporation method, the diffusion can be promoted by increasing the vacuum degree. The diffusion can be effectively promoted by ion-assist effect by irradiation of ionized gas to the substrate. Although the entire base body may be heated for promotion of the diffusion, excessive heating is not preferred since the entire heating promotes not only the diffusion on the outermost face but also promotes diffusion of the whole deposited matter.

For formation of a film or a layer having the phase-separated structure, particularly preferred substance includes Al, Zn, Ag, Cd, In, Sn, Sb, and Au. In forming a layer by use of any of these substances as granules dispersed in $(Si_xGe_{1-x})_yO_{1-y}$ ($0 \leq x \leq 1$, and $0.034 \leq y \leq 1$), in particular, Ag as the granules, active migration of Ag causes remarkable growth of the granule size and deposition on the substrate depending on a back pressure of the vacuum degree before the deposition, and depending greatly on residual oxygen and water. Addition of a foreign element is effective in inhibiting the migration. Addition of a material such as W which does not migrate on the substrate surface or addition of a Ag-miscible material, such as Nd, effectively inhibits the granule growth, and deposition on the substrate.

Figure 3:
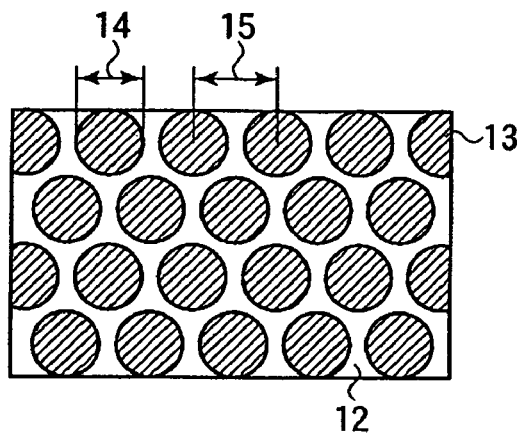
FIG. 3 shows schematically an upper face of a structure of the present invention.

As described above, the addition of a foreign material is effective for control of granule diameters 14 and granule intervals 15 in FIG. 3. Any element may be used except the element forming the granule portion. The foreign element is added preferably at a content of not more than 30 atom %. For promoting the diffusion, preferably mixed are Li, Na, Mg, Ca, Sr, Ba, Cd, Zn, K, Ga, Sn, and the like. For suppressing the diffusion, preferably mixed are W, Ta, Nb, Mo, Hf, Zr, V, Ti, Cr, Y, Ni, Fe, Co, Pt, Pd, and the like.

These materials will disperse spontaneously in the deposition process. By conducting the first step and the second step successively, the nonmagnetic matrix portions in the first step and the second step join together, and Ag or Cu granules join to magnetic granules deposited thereon. In the heat treatment step, inter-diffusion between the Ag or Cu granules and the magnetic granules placed perpendicularly facilitates the formation of an $L1_0$-ordered alloy. Incidentally, since air exposure or surface oxidation prevents the granule joining, the layers are preferably formed successively in a hydrogen atmosphere, a nitrogen atmosphere, or in a vacuum.

(Substrate)

A base body is prepared for producing the magnetic recording medium. The preferred material for the base body includes glass, and SUS. The base body may have an electroconductive layer formed thereon preliminarily. The base body may have a crystal face on the surface.

(Magnetic Granules)

The magnetic granule contains preferably any of Co, and MPt (M=Co, Fe), MPt being preferably in a state of an $L1_0$-ordered alloy. In the heat treatment, the magnetic granule portion contains Ag, Cu, or the like in uniform or inclined composition distribution, regardless of formation of a solid solution with the MPt (M=Co, Fe) by inter-diffusion. The Ag, Cu, or the like introduced by inter-diffusion enables ordering of MPt at a lower ordering temperature than that of MPt not containing Ag, Cu, or the like, and retards the granule-granule coalescence to enable formation of excellent magnetic granules.

In this Specification, the term "granule diameter" signifies the length denoted by the numeral 14 in FIG. 3; and the term "granule interval" signifies the distance denoted by the numeral 15 in FIG. 3.

The distribution of granule diameters 14 is preferably narrower, and the distribution of granule intervals 15 is preferably narrower. In particular, the granule diameter ranges preferably from 1 nm to 50 nm, and the granule interval ranges preferably from 2 nm to 20 nm, more preferably from 5 nm to 15 nm. The height of the granules ranges preferably from 6 nm to 40 nm, more preferably from 6 nm to 25 nm. The granules are arranged preferably in a honeycomb state as shown in the plan view of FIG. 3. However, the granule arrangement is not limited to the honeycomb arrangement.

Figure 4:
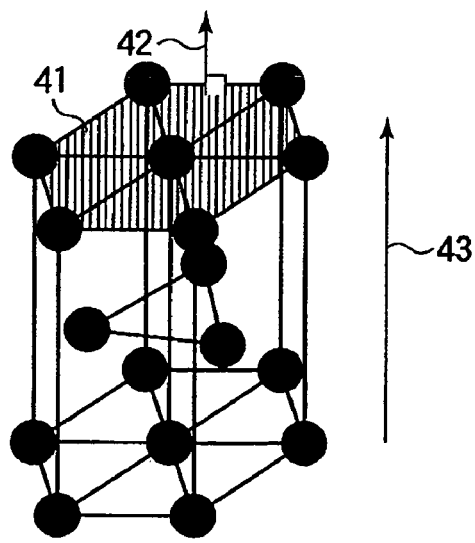
FIG. 4 is a schematic drawing showing an hcp structure and orientation thereof.

When the magnetic granule portion is composed of Co, the Co has preferably an hcp structure (hexagonal close-packed structure) with the c-axis directed perpendicular to the substrate. When the magnetic granule portion is composed of MPt (M=Co, Fe), the MPt is preferably an $L1_0$-ordered alloy with the c-axis directed perpendicularly to the substrate. The direction of c-axis 43 of the hcp structure (hexagonal close-packed structure) in the present invention is the same as that of normal line 42 to (001) plane 41 as shown in FIG. 4, so that the c-axis is directed to be perpendicular to the substrate. The direction of the c-axis of the $L1_0$-ordered alloy is the same as that of the normal line to (001) plane 41 as shown in FIG. 4, so that the c-axis is directed to be perpendicular to the substrate.

Figure 5A:
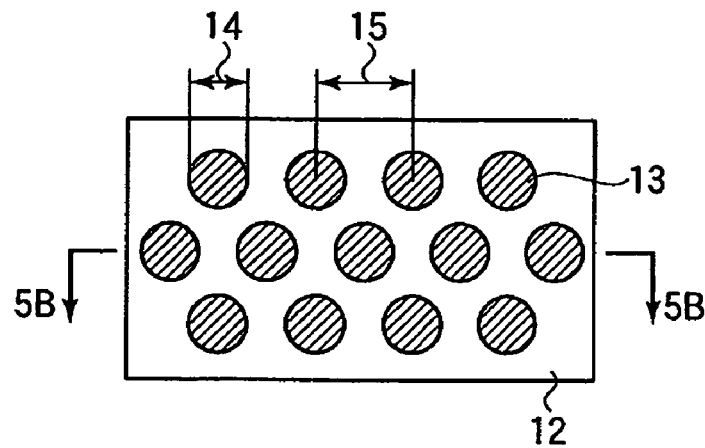
FIGS. 5A and 5B illustrate a magnetic recording medium produced through the production process of the present invention.
Figure 5B:
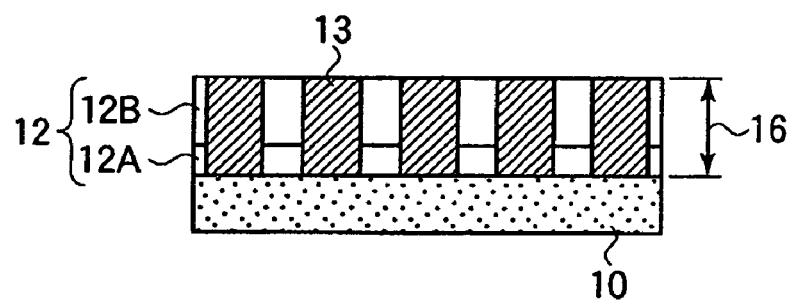
Figure 6:
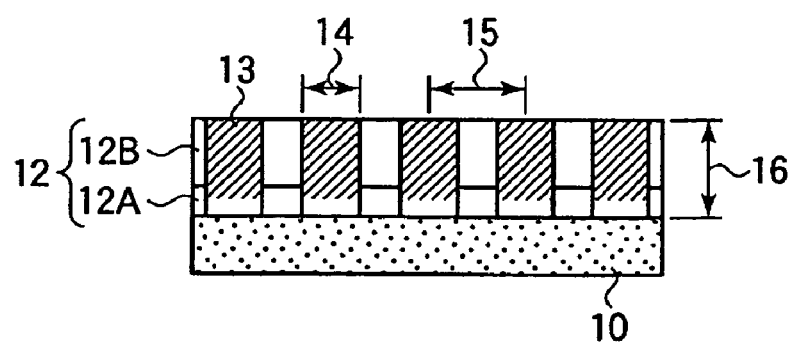
FIG. 6 illustrates a magnetic recording medium after formation of a layer containing Al granules dispersed therein.

FIGS. 5A and 5B illustrate schematically a magnetic recording medium produced through the production process including the heat treatment step of the present invention. FIG. 5B is a sectional view taken along line 5B-5B in FIG. 5A. In FIGS. 5A and 5B, the numerals denote the followings: 10, a base body; 13, a magnetic granule portion; 12, a nonmagnetic matrix portion; 12A, a first nonmagnetic material portion; 12B, a second nonmagnetic material portion; 14, a diameter of the magnetic granule; 15, an interval between magnetic granules; 16, a height of the magnetic granule portion. In FIG. 6, the numeral 13 denotes a magnetic granule, in which the content of Ag, Cu, or the like may be higher near the base body and may decrease gradually with the distance from the base body. Naturally, the magnetic granule 13 need not be constituted entirely of the $L1_0$-ordered alloy: in particular, in the part, near the base body, of the portion containing Ag, Cu, or the like at a higher content, the magnetic granule portion need not be $L1_0$-order-alloyed, and may be not ferromagnetic.

Figure 7:
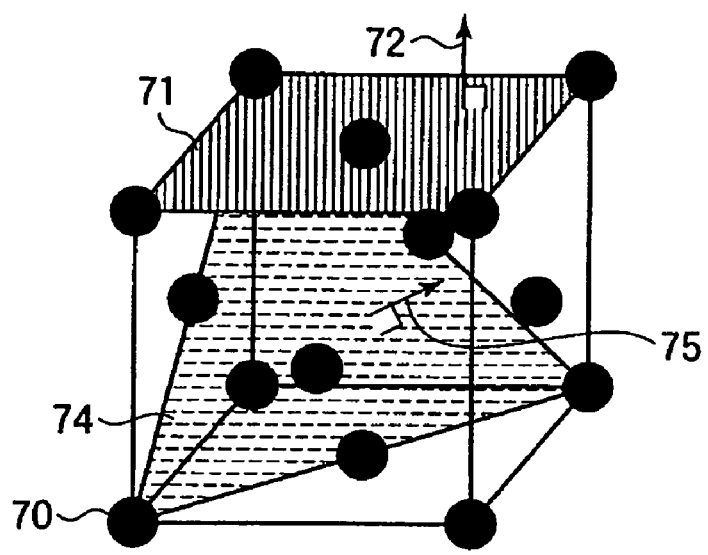
FIG. 7 is a schematic drawing showing an fcc structure and orientation thereof.
Figure 10:
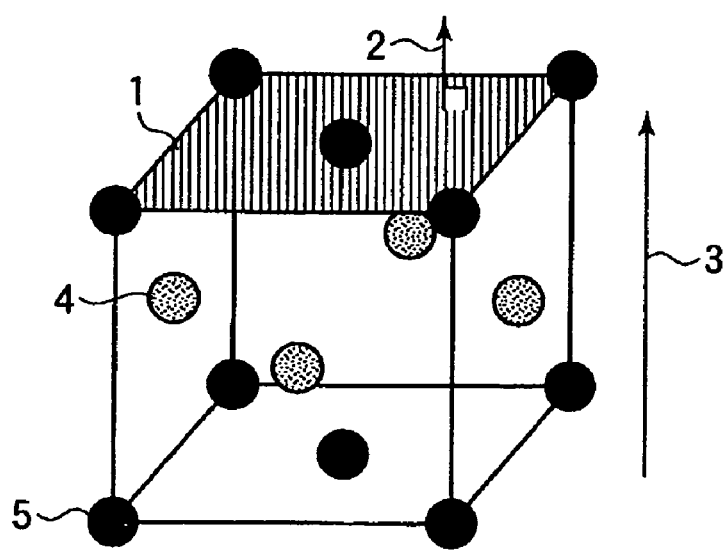
FIG. 10 shows a structure and orientation of an $L1_0$-ordered alloy.

Not being limited to the part of the magnetic granule portion containing Ag, Cu, or the like at a higher content near the base body, in any part containing Ag, Cu, or the like at a higher content, the magnetic granule portion need not be $L1_0$-order-alloyed, and may be not ferromagnetic. Further, in the $L1_0$-ordered alloy part of magnetic granule portion 13, the c-axis is preferably directed to be perpendicular to the substrate, whereas the other part not orderly alloyed has preferably an fcc structure (face-centered cubic structure) having (001) orientation in the axis direction perpendicular to the substrate surface. The (001) orientation of the fcc structure in the present invention signifies that normal line 72 to face 71 is directed perpendicular to the substrate as shown in FIG. 7. In FIG. 7, the solid round spots represent a constituting element or elements.

In FIG. 1, Ag or Cu granule 11 and magnetic granule 13 having an equal diameter to each other are joined together. However, the diameters may be different insofar as the granule portions are joined. Ag or Cu granule portion 11 and magnetic granule portion 13 are connected preferably epitaxially. Further, First nonmagnetic material portion 12A and second magnetic material portion 12B are both constituted preferably of $(Si_xGe_{1-x})_yO_{1-y}$ ($0 \leq x \leq 1$, $0.034 \leq y \leq 1$). The ratio of Si:Ge and the ratio of SiGe to oxygen in $(Si_xGe_{1-x})_yO_{1-y}$ may be the same or different between first nonmagnetic matrix 12A and second nonmagnetic matrix 12B. The combination of $(Si_xGe_{1-x})_yO_{1-y}$ first nonmagnetic material portion 12A with that of second nonmagnetic material portion 12B may be selected arbitrarily from the ranges of $0 \leq x \leq 1$ and $0.034 \leq y \leq 1$: for example, Si and Ge, Si and $GeO_2$, $SiO_2$ and Ge, $SiO_2$ and $GeO_2$, Si and $Si_{0.5}Ge_{0.5}$, $(Si_{0.5}Ge_{0.5})_{0.5}O_{0.5}$, and $(Si_{0.1}Ge_{0.9})_{0.5}O_{0.5}$.

When magnetic granule portion 13 is composed of cobalt, Ag or Cu granule portion 11 has preferably an fcc structure (face-centered cubic structure), having (111) orientation perpendicular to the substrate. The (111) orientation signifies that normal line 75 to (111) plane 74 is directed perpendicular to the substrate as shown in FIG. 7. When magnetic granule portion 13 is composed of MPt (M=Co, Fe), Ag or Cu granule portion 11 has preferably an fcc structure (face-centered cubic structure), having (001) orientation perpendicular to the substrate. The (001)-orientation signifies that the normal line to (001) plane is directed perpendicular to the substrate as shown in FIG. 7. Magnetic granule portion 13 need not be $L1_0$-ordered-alloyed. In that case, the portion has an fcc structure (face-centered cubic structure) preferably having (001)-orientation perpendicular to the substrate. The (001)-orientation signifies that the normal line to (001) plane is directed perpendicular to the substrate as shown in FIG. 7.

(Nonmagnetic Matrix Portion)

The nonmagnetic matrix portion is composed preferably of $(Si_xGe_{1-x})_yO_{-y}$ ($0 \leq x \leq 1$, $0.034 \leq y \leq 1$). However, a material not magnetic and capable of causing phase separation from any of Al, Au, and Cu may be used depending on the process. The ratio of Si to Ge, and the ratio of SiGe to oxygen may be constant or varied. The combination of $(Si_xGe_{1-x})_yO_{1-y}$ of the first layer formed in the first step with that of the second layer formed in the second step may be selected arbitrarily in the ranges of $0 \leq x \leq 1$ and $0.034 \leq y \leq 1$: for example, Si and Ge, Si and $GeO_2$, $SiO_2$ and Ge, $SiO_2$ and $GeO_2$, Si and $Si_{0.5}Ge_{0.5}$, $(Si_{0.5})_{0.5}O_{0.5}$, $Si_{0.1}Ge_{0.9})_{0.5}O_{0.5}$. The respective layers may contain partially the element constituting the granule portion.

(Heat Treatment Step)

The heat treatment is conducted at a temperature at which any of the granular Ag or Cu and any of MPt (M=Co, Fe) will begin to diffuse: preferably at a temperature not higher than 500° C., more preferably not higher than 400° C. The presence of Cu or Ag enables formation of the ordered alloy at a lower temperature than that of heating MPt singly. The heat treatment is preferably conducted under vacuum, or may be conducted in an atmosphere containing nitrogen or hydrogen. Naturally, the portion of $(Si_xGe_{1-x})_yO_{1-y}$ ($0 \leq x \leq 1$, $0.034 \leq y \leq 1$) deposited in the respective steps will not cause mutual diffusion with any of Ag and Cu and with any of MPt (M=Co, Fe). That is, the diffusion region should be limited between Ag or Cu and MPt (M=Co, Fe). Thereby, the magnetic material will not diffuse into the nonmagnetic matrix, being magnetically isolated to improve the magnetic properties. Consequently, growth of granules of MPt (M=Co, Fe) by granule coalescence in the substrate plane direction which is the problem in the conventional technique is prevented, and yet the $L1_0$-ordered alloy of MPt (M=Co, Fe) can be formed.

Second Embodiment

An embodiment of the present invention is explained below by reference to FIGS. 8A-8F. This Embodiment differs from the aforementioned embodiment in that phase-separated layers not containing magnetic granules are laminated, separated columnar portions are removed from the phase-separated layer to form pores, and a magnetic material is filled into the pores.

Figure 8A:
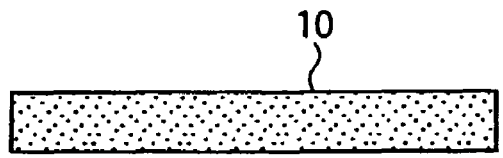
FIGS. 8A, 8B, 8C, 8D, 8E, and 8F show another process for production of the present invention.
Figure 8B:
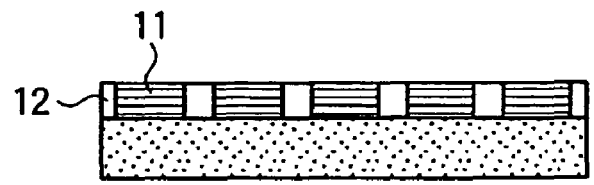
Figure 8C:
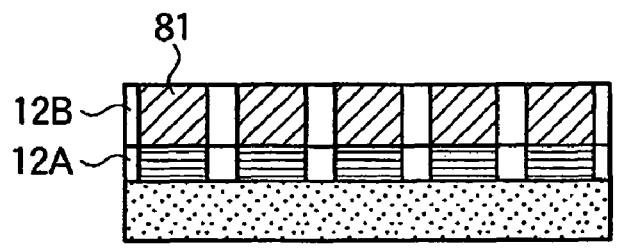
Figure 8D:
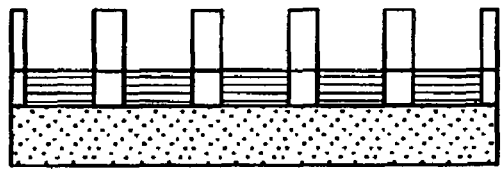
Figure 8E:
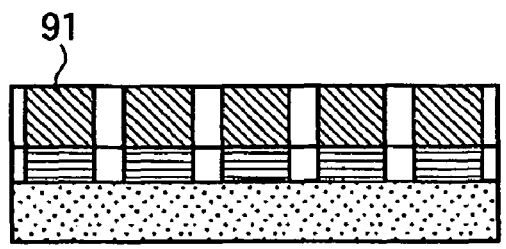
Figure 8F:
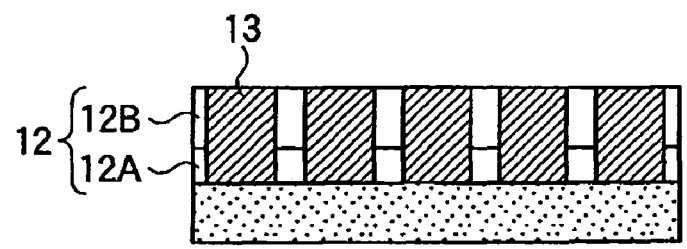
Figure 9A:
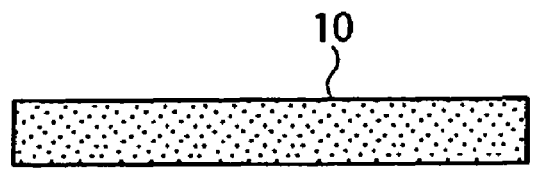
FIGS. 9A, 9B, 9C, 9D and 9E show still another process for production of the present invention.
Figure 9B:
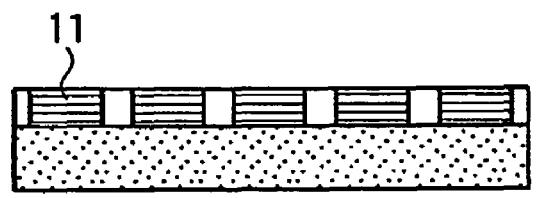
Figure 9C:
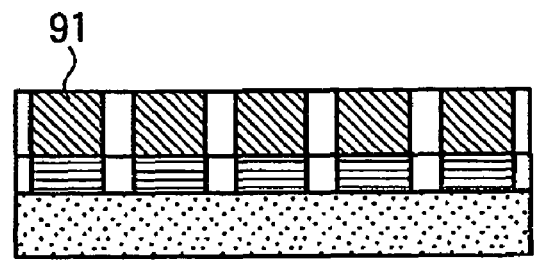
Figure 9D:
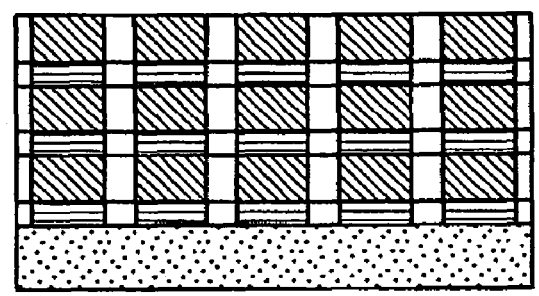
Figure 9E:
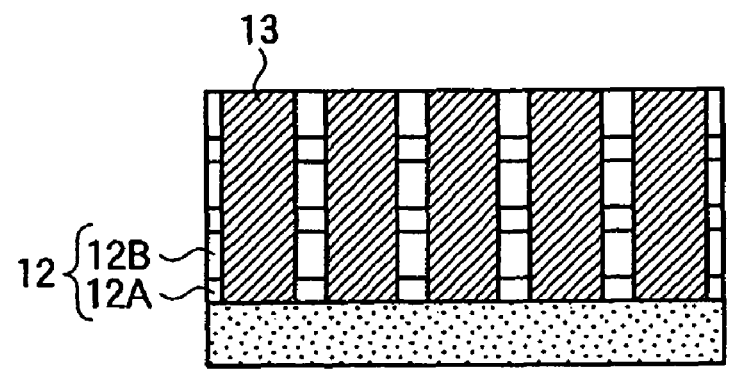

Specifically, base body 10 is prepared (FIG. 8A). On the base body, a first phase-separated layer is formed by a gas phase deposition method in which Cu or Ag granules 11 are dispersed in nonmagnetic matrix portion 12 (FIG. 8B). Then Al granule portion 81 is laminated on the Cu or Ag granule portions 11 by a gas-phase deposition method, and nonmagnetic matrix 12B is laminated on nonmagnetic matrix 12A of portion 12 as a second phase-separated layer (FIG. 8C). Thereafter, Al granule portion 81 is removed to form pores (FIG. 8D). Into the formed pores, magnetic granules 91 are filled (FIG. 8E). Heat treatment is conducted to convert magnetic granules 89 into an ordered alloy to form magnetic granule portion 13. Thus a magnetic recording medium is produced.

This embodiment is different from the first embodiment described by reference to FIGS. 1A-1D in the technique to form pores by removing the Al granule portions: Other steps in this embodiment can be conducted in the same manner as in the first embodiment described previously. Therefore, the technique of removal of the Al granule portions is explained below.

Al is used by the reason that Al granules readily cause phase separation from Si or Ge, and that Al is readily soluble in an acid to enable readily to form fine pores for filling magnetic granules (mainly Co, or MPt (M=Co, Fe). For the etching, useful are acids (e.g., aqueous phosphoric acid, aqueous sulfuric acid, etc.) and weak alkalis (e.g., aqueous ammonia, aqueous dilute sodium hydroxide solution, etc.) which do not dissolve Si and Ge. The magnetic granules (mainly Co, or MPt (M=Co, Fe)) can be filled by metallization.

EXAMPLES

Example 1

(Film Having Si Phase and Cu or Ag Phase, and Film Having $Fe_{50}Pt_{50}$ Phase and $SiO_2$ Phase)

On a glass substrate, a MgO-(001) layer was formed in a thickness of 10 nm. Thereon, another film was formed in a thickness of 5 nm by sputtering by use of a Si target on which 12 pieces of Cu or 8 pieces of Ag of 10 mm square are placed symmetrically with an erosion area at sputtering conditions of the argon pressure of 0.1 Pa and the RF power of 100 W. The formed film was confirmed to have a granular structure in which Cu or Ag granules have diameters of about 6 nm and have an fcc structure (001)-oriented perpendicularly to the substrate, and the granules were surrounded by Si matrix (possibly contaminated by a small amount of oxygen).

Successively further thereon, a film was formed by sputtering simultaneously $Fe_{50}Pt_{50}$ and $SiO_2$ in a thickness of 15 nm. In the formed film, the FePt granules having diameters of about 6 nm having a (001) -oriented fcc structure were confirmed to be joining to the Cu or Ag granules by observation of a cross-section by transmission electron microscopy.

Separately, as a comparative example, only a film containing $Fe_{50}Pt_{50}$ was formed on the MgO-(001) layer.

The samples were heated at 300° C., 400° C., or 500° C. for 30 minutes. The average diameters of the $Fe_{50}Pt_{50}$ granules were measured by processing the image data obtained by transmission electron microscopy. The coercivities perpendicular to the substrate were measured at 500° C. Table 1 shows the measurement results.

TABLE 1

| | Granule diameter | | | | Coercivity |
|---|---|---|---|---|---|
| | Before heat treatment | After heat treatment | | | |
| | | 300° C. | 400° C. | 500° C. | 500° C. |
| FePt—$SiO_2$ only | 6 nm | 6 nm | 9 nm | 20 nm | 1.5 KOe |
| FePt—$SiO_2$/ Cu—Si | 6 nm | 6 nm | 6 nm | 7 nm | 5.0 KOe |
| FePt—$SiO_2$/ Ag—Si | 6 nm | 6 nm | 7 nm | 8 nm | 4.2 KOe |

From the above results, the granule growth was found to be less in heating at 500° C. in the sample having a Ag or Cu granular layer. The effect of lowering the temperature was confirmed by the coercivity.

According to observation by transmission electron microscopy of the cross-section of the samples after 500° C. -heat treatment, inter-diffusion was found to have occurred between the Cu granules and the FePt granules to make the granule boundaries indefinite. From the composition analysis, the concentration of Cu was higher in the portions where the Cu granules were formed originally, whereas, in the FePt portions, the concentration of Cu detected was lower. Thereby, the Cu concentration is confirmed to incline in the direction perpendicular to the substrate.

Example 2

(Film Having Ge Phase and Cu or Ag Phase and Film Having $Fe_{50}Pt_{50}$ Phase and $SiO_2$ Phase)

On a glass substrate, a MgO-(001) film was formed in a thickness of 10 nm. Thereon, another film was formed in a thickness of 5 nm by sputtering by use of a Ge target on which 14 pieces of Cu or 10 pieces of Ag of 10 mm square were placed symmetrically with an erosion area at sputtering conditions of the argon pressure of 0.1 Pa and the RF power of 60 W. The formed film was confirmed to have a granular structure in which Cu or Ag granules have diameters of about 6 nm and have an fcc structure (001)-oriented perpendicularly to the substrate, and the granules were surrounded by Ge matrix (possibly contaminated by a small amount of oxygen).

Further thereon successively, a film having a $Fe_{50}Pt_{50}$ phase and a $SiO_2$ phase was formed by sputtering simultaneously $Fe_{50}Pt_{50}$ and $SiO_2$ in a film thickness of 15 nm. In the formed film, the FePt granules having diameters of about 6 nm having a (001)-oriented fcc structure were confirmed to be joining to the aforementioned Cu or Ag granules by observation of a cross-section by transmission electron microscopy.

Example 3

(Laminate of Films Having Si Phase and Cu or Ag Phase and Films Having $Fe_{50}Pt_{50}$ Phase and $SiO_2$ Phase)

In the same deposition process as in Example 1, lamination film is prepared which has respectively three granular layers of 2 nm thick containing Ag granules or Cu granules and three granular layers of 10 nm thick containing $Fe_{50}Pt_{50}$ granules laminated alternately. By observation of the cross-section of the obtained lamination film by transmission electron microscopy, the lamination film is confirmed to be constituted of three granular layers containing Ag or Cu granules and three granular layers containing FePt granules laminated alternately as shown in FIGS. 9A-9E. The lamination films after heating at 500° C. for 30 minutes in vacuum are compared with the two-layer film of Example 1. The properties of the films of this Example are not different so much from that of Example 1. However, from the local composition analysis by cross-sections by transmission electron microscopy, the inclination of the Cu concentration in the direction perpendicular to the substrate is found to be prevented to distribute the Cu uniformly like that of the magnetic granule portion as shown in FIGS. 8A-8F. In the Ag-containing films, Ag does not form solid solution and distributes uniformly by the composition analysis.

In the same manner as above, a laminate can be produced by employing the granular layer containing Ag or Cu granules of Example 2.

Example 4

(Production According to Second Embodiment)

A granular layer containing Ag or Cu granules is formed in a thickness of 5 nm according to the deposition process of Example 1. Thereon, a film is formed in a thickness of 15 nm by sputtering with a target of $Al_{53}Si_{47}$ of 101.6 mm (4 inches) at sputtering conditions of the argon gas pressure of 0.1 Pa and the RF power of 100 W. The formed Al granule portions have diameters of about 6 nm and are found to be formed to join to the Ag or Cu granule portions by observation of cross-section of the film by transmission electron microscopy.

Successively, the Al granular portions are removed by immersion in an aqueous 0.3 mol/L phosphoric acid for 15 minutes. Thereby, the structure has fine pores corresponding to the one after the third step between FIGS. 8C and 8D in the process shown in FIGS. 8A-8F.

Then the fine pores are filled with $Fe_{50}Pt_{50}$ by electro-deposition in a FePt plating solution, and the excessive portion outside the fine pores is removed by precision polishing. By observation of the cross-section, FePt granules can be confirmed to join to Ag or Cu granules. The plating solution is an aqueous solution containing iron sulfate and hexachloroplatinic acid as the main constituents. The potential is controlled to obtain deposition of $Fe_{50}Pt_{50}$.

Finally, the product is heat-treated at 500° C. to achieve the same result as in Example 1. Thereby, the coalescence of FePt granules is prevented, and the ordering is allowed to proceed by inter-diffusion with Ag or Cu by heat treatment at 500° C.

In the same manner as above, a laminate of this embodiment can be produced by employing the granular layer containing Ag or Cu granules of Example 2.

As described above, the present invention provides a magnetic recording medium which is improved in magnetic properties. The improvement enables higher recording density per unit area, and miniaturization of the recording medium. The miniaturized recording medium is useful not only as the hard disk of personal computers but also for the recording medium for small instruments such as portable telephones.

This application claims priority from Japanese Patent Application No. 2005-171430 filed on Jun. 10, 2005, which is hereby incorporated by reference herein.

What is claimed is:

1. A process for producing a magnetic recording medium having a recording layer comprised of magnetic granule portions dispersed in a nonmagnetic matrix portion, comprising:
    a first step of forming, on a base body, a nonmagnetic matrix portion and Cu or Ag granule portions dispersed therein by gas-phase deposition,
    a second step of laminating magnetic granule portions on the Cu or Ag granule portions to join the magnetic granule portions and the Cu or Ag granule portions and laminating an additional nonmagnetic matrix portion on the nonmagnetic matrix portion formed in the first step by gas-phase deposition, and
    a third step of heat-treating the laminate to inter-diffuse the Ag or Cu granule portions and the magnetic granule portions.

2. The process for producing a magnetic recording medium according to claim 1, wherein the nonmagnetic matrix portion is composed of $(Si_xGe_{1-x})_yO_{1-y}$ ($0 \leq x \leq 1$, $0.03 \leq y \leq 1$).

3. The process for producing a magnetic recording medium according to claim 1, wherein the magnetic granule contains Co or MPt (M=Co, Fe).

4. The process for producing a magnetic recording medium according to claim 1, wherein the first step and the second step are repeated.

5. A process for producing a magnetic recording medium having a recording layer constituted of magnetic granule portions dispersed in a nonmagnetic matrix portion, comprising:
    a first step of forming, on a base body, a nonmagnetic matrix portion and Cu or Ag granule portions dispersed therein by gas-phase deposition,
    a second step of laminating Al granule portions on the Cu or Ag granule portions and laminating an additional nonmagnetic matrix portion on the nonmagnetic matrix portion formed in the first step by gas-phase deposition, and
    a third step of removing the Al granule portions to form pores, filling magnetic granules into the formed pores to join the magnetic granules to the Cu or Ag granule portions and heat treating the magnetic granules to inter-diffuse the Ag or Cu granule portions and the magnetic granules.

6. The process for producing a magnetic recording medium according to claim 5, wherein the nonmagnetic matrix portion is composed of $(Si_xGe_{1-x})_yO_{1-y}$ ($0 \leq x \leq 1$, $0.034 \leq y \leq 1$).

7. The process for producing a magnetic recording medium according to claim 5, wherein the magnetic granule contains Co or MPt (M=Co, Fe).

* * * * *